United States Patent
Oo et al.

(10) Patent No.: US 9,537,321 B2
(45) Date of Patent: Jan. 3, 2017

(54) METHOD AND APPARATUS FOR POWER TRANSFER FOR A PORTABLE ELECTRONIC DEVICE

(71) Applicant: MOTOROLA SOLUTIONS, INC, Schaumburg, IL (US)

(72) Inventors: Wei Lun Oo, Penang (MY); Chee Khon Chong, Penang (MY); Fook Teng Fam, Penang (MY); Sin Keng Lee, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 47 days.

(21) Appl. No.: 14/631,030

(22) Filed: Feb. 25, 2015

(65) Prior Publication Data
US 2016/0248265 A1   Aug. 25, 2016

(51) Int. Cl.
*H02J 5/00* (2016.01)
*H02J 7/02* (2016.01)
*A41D 1/00* (2006.01)
*H02J 7/00* (2006.01)
*H04B 5/00* (2006.01)

(52) U.S. Cl.
CPC .............. *H02J 5/005* (2013.01); *A41D 1/005* (2013.01); *H02J 7/0042* (2013.01); *H02J 7/025* (2013.01); *H02J 50/20* (2016.02); *H02J 50/50* (2016.02); *H04B 5/0075* (2013.01); *H04B 5/0037* (2013.01)

(58) Field of Classification Search
CPC ............ H02J 5/005; H02J 7/025; H02J 17/00; H04B 5/0025–5/0093; B60L 11/182; B60L 11/1829–11/1831; Y02T 90/122; H01F 38/14; H01F 2038/143–2038/146
USPC ............................................ 307/104; 320/108
See application file for complete search history.

(56) References Cited

U.S. PATENT DOCUMENTS

| | | | | |
|---|---|---|---|---|
| 6,388,422 B1* | 5/2002 | Lew | ........................ | G01S 19/18 |
| | | | | 2/102 |
| 6,924,619 B2* | 8/2005 | Dvorak | .................... | H02J 7/025 |
| | | | | 320/108 |
| 7,076,206 B2* | 7/2006 | Elferich | .................. | H02J 5/005 |
| | | | | 219/629 |

(Continued)

OTHER PUBLICATIONS

The International Search Report and the Written Opinion, SN: PCT/US2016/017436, filed: Feb. 11, 2016, mailed May 11, 2016, all pages.

*Primary Examiner* — Rexford Barnie
*Assistant Examiner* — Elim Ortiz
(74) *Attorney, Agent, or Firm* — Barbara R. Doutre (57) ABSTRACT

A power transfer interface (120) is formed of a primary repeater coil (104) and one or more secondary repeater coils (106) coupled via a wired interconnect (110), and integrated within a garment (114). The repeater coils operate as part of a wireless charging or powering system in which a transmit coil (102), located in a vehicle or a radio, is driven to magnetically couple a wireless radio frequency (RF) power signal to the primary repeater coil (104) which in turn transfers the RF power signal to the secondary repeater coil (106) via the wired interconnect (110). The system further comprises a portable electronic device (220) having a receive coil (108). The receive coil (108) wirelessly receives the RF power signal from the secondary repeater coil (106), which can in turn be used to power the portable device or charge a battery of the portable device.

12 Claims, 7 Drawing Sheets

(56) References Cited

U.S. PATENT DOCUMENTS

| | | | |
|---|---|---|---|
| 7,863,859 B2 * | 1/2011 | Soar | F41H 1/02 |
| | | | 307/104 |
| 7,994,752 B2 * | 8/2011 | Soar | B60N 2/44 |
| | | | 307/104 |
| 8,427,101 B2 * | 4/2013 | Saunamaki | H02J 5/005 |
| | | | 320/108 |
| 8,633,616 B2 * | 1/2014 | Soar | B60N 2/24 |
| | | | 307/104 |
| 8,841,881 B2 | 9/2014 | Failing | |
| 9,126,514 B2 * | 9/2015 | Soar | B60N 2/4876 |
| 9,293,927 B2 * | 3/2016 | Soar | F41G 1/34 |
| 2004/0000974 A1 | 1/2004 | Odenaal et al. | |
| 2006/0267790 A1 | 11/2006 | Matthiessen et al. | |
| 2007/0250981 A1 | 11/2007 | Seibert | |
| 2009/0029743 A9 | 1/2009 | Lair et al. | |
| 2011/0058705 A1 | 3/2011 | Lee et al. | |
| 2011/0214926 A1 | 9/2011 | Ichikawa | |
| 2011/0278956 A1 | 11/2011 | Eckhoff et al. | |
| 2012/0228954 A1 | 9/2012 | Kesler et al. | |
| 2013/0005251 A1 | 1/2013 | Soar | |

\* cited by examiner

METHOD AND APPARATUS FOR POWER TRANSFER FOR A PORTABLE ELECTRONIC DEVICE

FIELD OF THE DISCLOSURE

The present disclosure relates generally to wireless power transfer, and more particularly to an interface, apparatus and method that facilitate power transfer for charging and/or powering one or more portable communication devices.

BACKGROUND

Battery powered accessory devices are often used in conjunction with a main radio device. The powering and charging of portable devices, particularly those operating within the public safety area, is critical. Wireless charging is becoming increasingly desirable, however wireless charging of small portable electronic devices can be very challenging due to tight space constraints. Over-the-Air (OTA) wireless charging may utilize a receiver coil and a transmit coil, however achieving magnetic resonance or strongly coupled magnetic resonance (SCMR) requires both the transmit (TX) and receive (RX) coils to be proportionally large for charging over certain distances. Hence, such coils are impractical in smaller portable accessories, for example a remote speaker microphone (RSM). The RSM is a radio accessory used in public safety to provide remote access to portable radio control features. The ability to facilitate charging the RSM and/or other smaller accessory type devices is highly desirable. Additionally, the ability to power small portable electronic devices that do not have batteries would also be beneficial.

Accordingly, there is a need to improve power transfer to a portable electronic device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an apparatus, system and method that facilitate power transfer to one or more portable electronic devices. An interface apparatus of the system is formed of a primary repeater coil and one or more secondary repeater coils integrated within a garment and coupled via a wired interconnect. The repeater coils of the interface apparatus operate as part of an overall power transfer system in which a transmit coil is driven to magnetically couple a radio frequency (RF) power signal to the primary repeater coil which in turn transfers the charging RF power signal to the one or more secondary repeater coils via the wired interconnect. The system further comprises one or more body-worn portable electronic devices, each having a receive coil. The one or more body-worn portable electronic devices may or may not have batteries. Each receive coil of the one or more body-worn portable electronic devices wirelessly receives the RF power signal from the secondaryrepeater coil of the interface apparatus. The received RF power signal at the receive coil can be used to charge a battery of a body-worn portable electronic device having a battery and/ or power a body-worn portable electronic device that does not have a battery. A single transmit coil and a single primary repeater coil are thus used in conjunction with one or more secondary repeater coils to transfer power to one or more body-worn electronic devices having receive coils for charging and/or powering. The power transfer system thus advantageously provides the ability to automatically charge and/or power one or more portable electronic devices.

Figure 1:
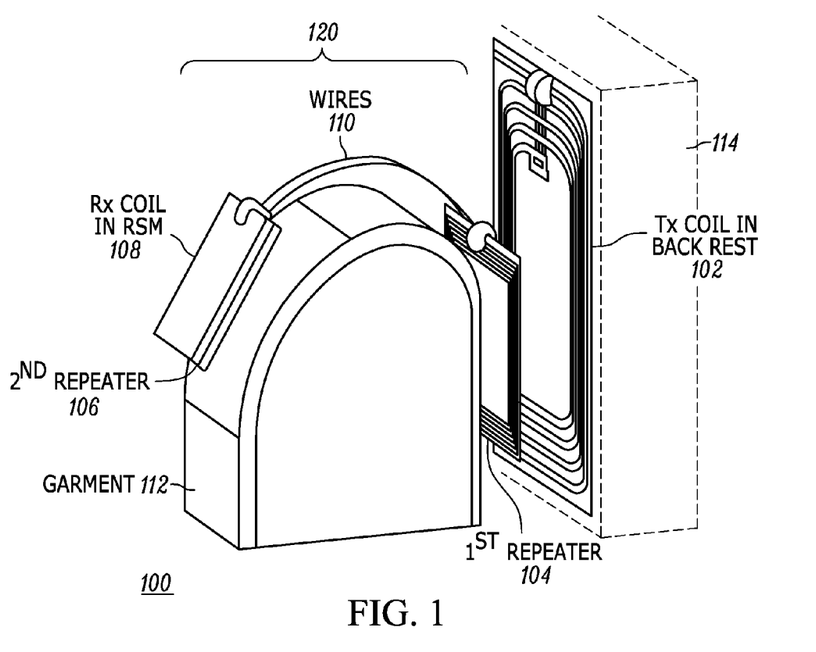
FIG. 1 is a power transfer system formed and operating in accordance with some embodiments.

FIG. 1 is a power transfer system 100, formed and operating in accordance with some embodiments. Power transfer system 100 comprises a transmit (TX) coil 102, a power transfer interface apparatus 120, and a receive (RX) coil 108. In accordance with some embodiments, the interface apparatus 120 comprises a primary repeater coil 104 and a secondary repeater coil 106 coupled via a wired interconnect 110 and integrated within a garment 112. The garment 112 having primary and secondary repeaters 104, 106 embedded therein enable charging to a battery of a body worn portable electronic device by coupling a received power transfer signal from the primary repeater coil 104 to the secondary repeater coil 106 over wired interconnect 110. Additional embodiments of the interface apparatus 120 will further describe how additional secondary repeater coils 106 can be integrated within garment 112 for charging a plurality of body worn portable electronic devices within power transfer system 100. Alternatively, for portable electronic devices not having batteries, the RF power transfer signal can be used to power these devices.

Referring to the overall operation of power transfer system 100, in accordance with some embodiments, the transmit coil 102 magnetically couples to the primary repeater coil 104 over wired interconnect 110. The receive (RX) coil 108 is located in a portable electronic product, such as a remote speaker microphone or other portable electronic accessory. The secondary repeater coil 106 receives the transferred signal and magnetically couples the RF power signal to the receive (RX) coil 108. The transferred power signal received by the RX coil 108 of the portable electronic device can be used, for example, to charge a battery of the portable device or to power the portable electronic device not having a battery.

Figure 2:
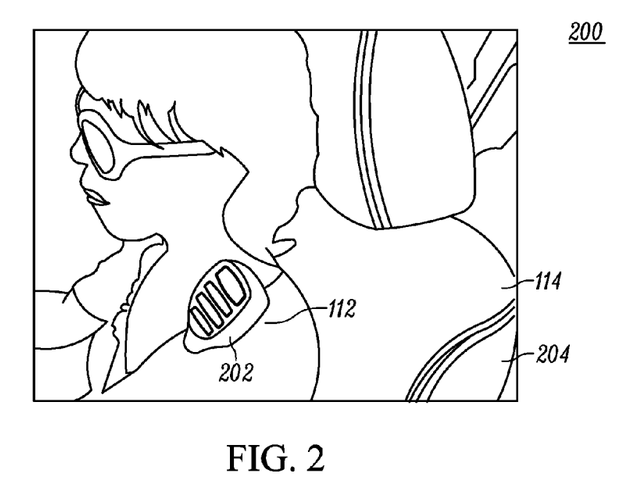
FIG. 2 is an example of a usage application of the power transfer system in accordance with some embodiments.

FIG. 2 is an example of a usage application of the power transfer system 100 in accordance with some embodiments. The usage embodiment illustrates a portable electronic device, embodied here as a remote speaker microphone (RSM) 202, however those skilled in the art will appreciate that other portable electronic devices and radio accessories, such as sensors, Bluetooth, and WiFi accessories may also benefit from the wireless power transfer system of the various embodiments. The power transfer system 100 comprises remote speaker microphone (RSM) 202 having the receive (RX) coil 108 (of FIG. 1) mounted therein. The RSM 202 is typically a shoulder worn device and as such the secondary repeater coil 106 (of FIG. 1) is positioned within the shoulder portion of garment 112. The transmit (TX) coil 102 (of FIG. 1) may be integrated within a vehicle 114, and appropriately located in a position for alignment and proximate coupling (magnetic resonance coupling) with the primary repeater coil 104 of the garment 112. For example, the transmit coil 102 may be integrated in a backrest of the vehicle 114 and coupled to appropriate power source electronics within the vehicle. Other appropriate locations for the transmit coil 102 may be an armrest, door panel, seat or other location that provides for alignment and proximate wireless coupling (magnetic resonance coupling) of the transmit coil 102 with the primary repeater coil 104, when the power transfer interface apparatus 120 is worn by a user located in the vehicle 114.

In accordance with some embodiments, the RSM can have batteries and these batteries are charged in response to the transmit coil 102 wirelessly transferring power to the primary repeater coil 104 and the primary repeater coil 104 routing power 204 over the wired interconnect 110 to secondary repeater coil 106 for wirelessly transferring RF power to receive (RX) coil 108 which in turn is used to charge the batteries of the RSM 202. Thus, the RSM can be automatically charged when a user wearing the RSM 202 is seated in the vehicle 114. The automatic nature of the charging advantageously extends battery life even during heavy usage duty cycles. The ability to automatically charge the battery during usage further facilitates the ability to reduce battery size. The charging apparatus and method of the various embodiments is particularly beneficial for battery operated wireless devices being used in a portable environment.

In accordance with other embodiments, an RSM 202 not having batteries may be powered in response to the transmit coil 102 wirelessly transferring power to the primary repeater coil 104 and the primary repeater coil 104 routing power 204 over the wired interconnect 110 to secondary repeater coil 106 for wirelessly transferring RF power to receive (RX) coil 108 which in turn powers the RSM 202. The automatic nature of powering a portable electronic device not having batteries lightens the weight of the body-worn device and reduces the number of wires or contacts.

Thus, the RSM 202 can be automatically powered (for an RSM without battery) or charged (for an RSM with battery) when a user wearing the RSM 202 is seated in the vehicle 114. The power transfer of the various embodiments is thus beneficial for both battery and non-battery portable electronic devices being used in a portable environment.

Referring to FIGS. 1 and 2, the power transfer interface apparatus 120 can be attachable and detachable within the garment 112 so that each garment can be customized for individual users for desired placement of the transmit and receive repeater coils 104, 106. Markers or indicators on the garment can also be used to facilitate alignment of the portable electronic device(s) having receive (RX) coil(s) with the secondary repeater coil(s) of the garment 112. Alternatively, predetermined areas of the garment can be dedicated to the placement of the primary repeater coil 104, and the one or more secondary repeater coils 106.

While described thus far in terms of a vehicular environment, the power transfer system 100 also applies to other portable embodiments, such as a portable radio environment, where a battery of the portable radio is used as a power source to charge or power body-worn accessories as will be described in further detail later.

Figure 3A:
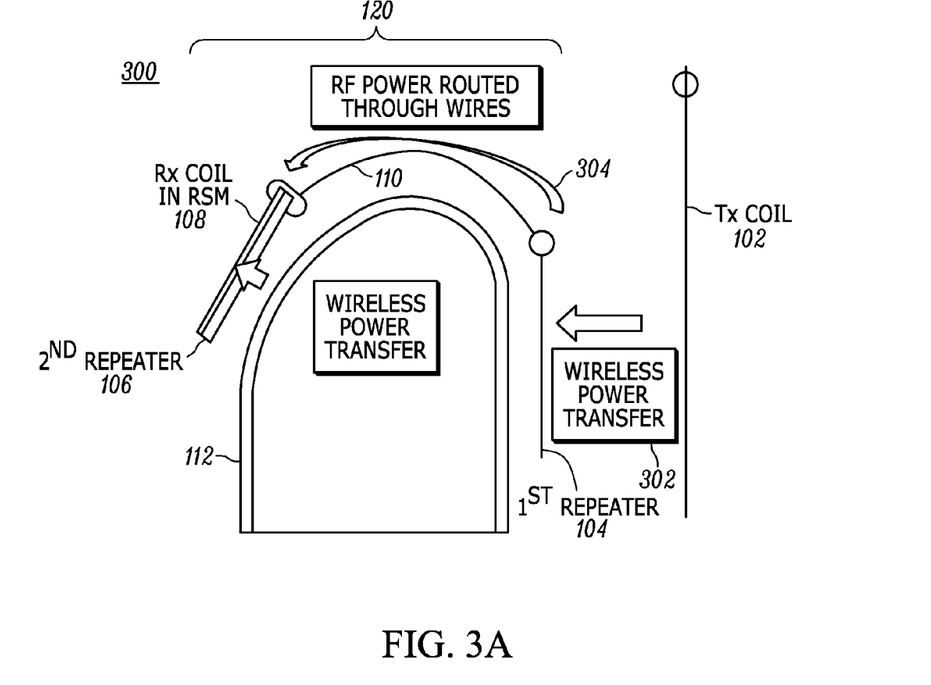
FIG. 3A is a signal flow diagram of the power transfer system, in accordance with some embodiments.

FIG. 3A is a signal flow diagram 300 of the power transfer system 100, in accordance with some embodiments. In operation, the transmit (TX) coil 102 magnetically couples to the primary repeater coil 104 thereby wirelessly transferring RF power signal 302 thereto. The RF power signal 302 is then transferred 304 via wired interconnect 110 to the secondary repeater coil 106. The secondary repeater coil 106 wirelessly transfers power to the receive (RX) coil 108 in the portable electronic device. Controllers in the vehicle and/or the portable accessory manage protocols associated with charging and powering as appropriate. The portable electronic device, such as the RSM 202, may be wirelessly coupled to another electronic device, such as a portable radio.

Figure 3B:
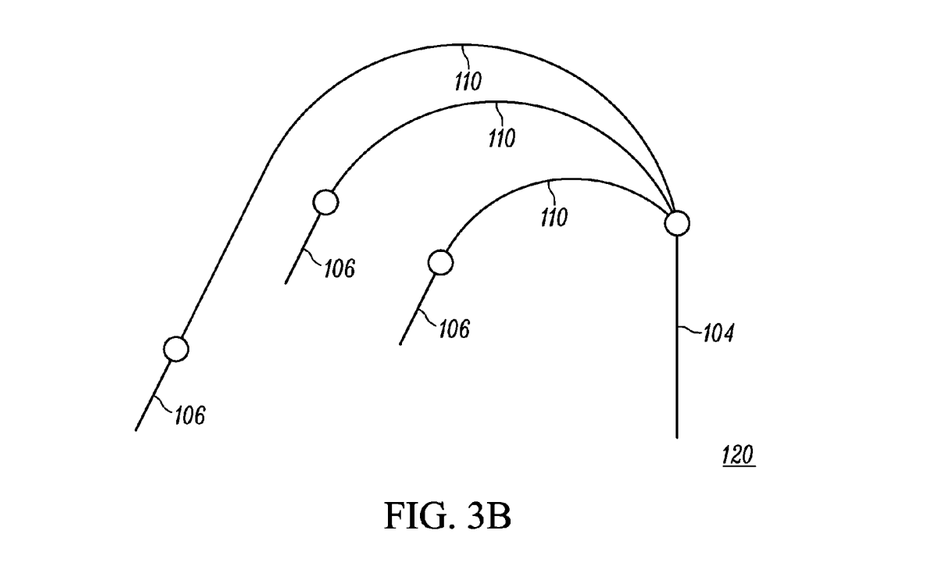
FIG. 3B is a diagram of a power transfer interface of the power transfer system, in accordance with some embodiments.

FIG. 3B is a diagram of the power transfer interface 120 of FIG. 1 with additional secondary repeater elements 106, in accordance with some embodiments. Primary repeater coil 104 is coupled via wired interconnect 110 to the secondary repeater coils 106. In accordance with the various embodiments, the power transfer interface 120 may be integrated into one or more garments 112, such as a vest and/or belt.

Figure 4:
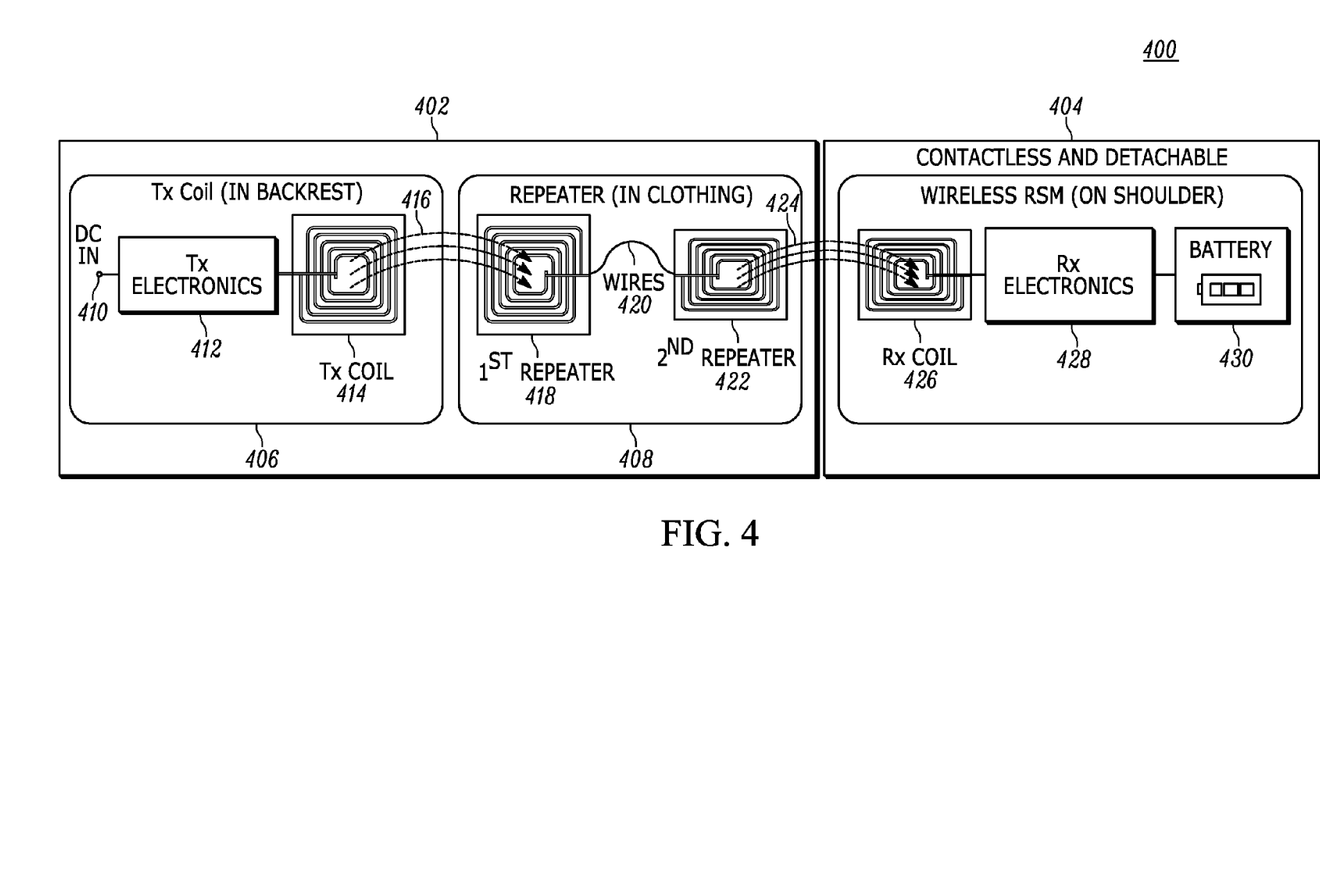
FIG. 4 is a block diagram of the power transfer system being applied in a wireless charging system, in accordance with some embodiments.

FIG. 4 is an electronic block diagram of the power transfer system being applied in a charging system 400, in accordance with some embodiments. The charging system 400 comprises a charger portion 402 and a portable device to be charged portion 404. The charger portion 402 comprises a power source portion 406 and charging interface portion 408. The charging interface portion 408 represents the power transfer interface apparatus 120 of FIG. 1 and FIG. 3B in accordance with some embodiments. The power source portion 406 comprises DC power 410, transmit electronics 412 and a transmit (TX) coil 414. The power source elements may be located in a vehicle, with the TX coil 414 preferably being located in a vehicle, for example the backrest of a vehicle. The TX coil transmits power charging signal 416 to the charging interface portion 408.

While described in terms of a vehicular environment, charging system 400 also applies to other portable embodiments, such as a portable radio environment where a battery of the portable radio is used as the a power source to charge body-worn accessories as will be described in further detail later.

The charging interface portion 408 comprises a primary repeater coil 418 coupled via wired interconnect 420 to a secondary repeater coil 422. The primary repeater coil 418 transfers the RF power charging signal over the wired interconnect 420 to the secondary repeater coil 422. The portable electronic device 404 comprises a receive (RX) coil 426, electronics 428 a battery 430. In accordance with some embodiments, the RF power signal is magnetically coupled 424 and received at receive coil 426 which in turn is coupled to the receive electronics 428 to charge the battery 430.

The transmit electronics 412 of the charger portion 402 may further comprise controller, converter, frequency source, RF amplifier and matching circuitry, such circuitry being known in the art, to properly convert the DC input to deliver energy to the transmit (TX) coil 414 with sufficient power (including taking into account losses through the interface apparatus) to charge the battery 430 of the device to be charged.

The receive electronics 428 of the device to be charged 404 may further comprise matching circuitry, rectifier filters and voltage converters, as known in the art, to provide a properly regulated charge to the battery 430. The device to be charged 404, may be a portable electronic device having a battery. In accordance with some embodiments, the portable electronic device 404 can advantageously be free of external housing battery charging contacts (i.e. contactless) in applications as the device is capable of being charged via the RX coil 426. Thus, the device to be charged 404 can be an attachable/detachable device which can be easily charged while attached to a garment.

Figure 5:
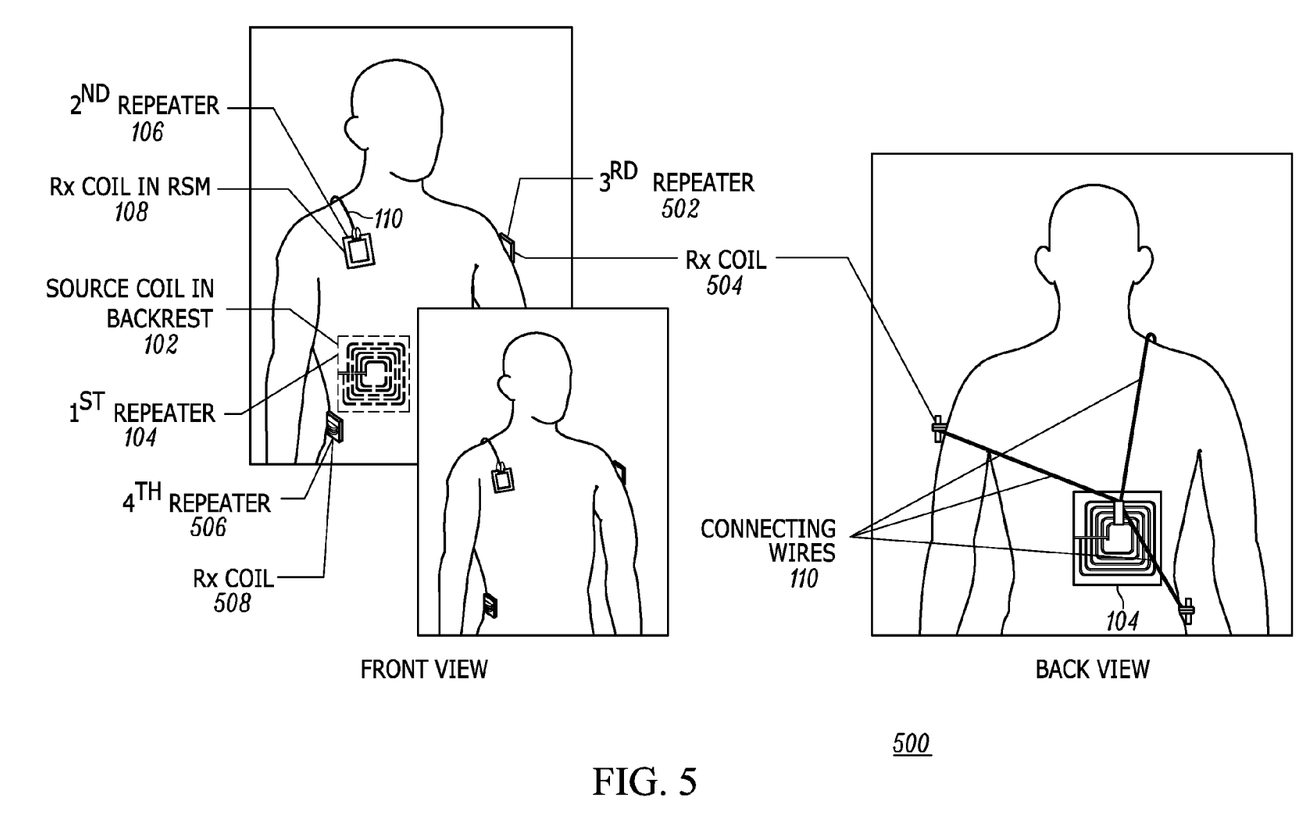
FIG. 5 is a diagram of the power transfer system being applied in a multi-device charging system, in accordance with some embodiments.

FIG. 5 is a diagram of the power transfer system being applied in a multi-device charging system 500, in accordance with some embodiments. A connected network is provided via a primary repeater coil 104 being wired to a plurality of secondary repeater coils 106, 502, 506. Power is transferred wirelessly from the transmit (TX) coil 102 (shown in FIG. 1) to the primary repeater coil 104 which is then routed via wired interconnect 110 to the plurality of secondary repeater coils 106, 502, 506 for charging a plurality of body-worn devices, each having a respective receive (RX) coil 108, 504, 508, worn at different locations of the body. These devices to be charged may comprise but are not limited to, an RSM, sensors, cameras on the arm, radios, gun sensors worn about the waist to name a few. The repeaters and wires can be embedded in a garment, such as a vest, belt or jacket, as described previously.

The connected network having the power transfer interface 120 formed in accordance with the embodiments can provide sufficient efficiency for charging not only one, but a plurality of devices simultaneously. Thus, another advantage of the power transfer interface apparatus 120 is the ability to adapt the interface through additional secondary repeater coils 502, 506 to charge more than one body-worn device simultaneously. A plurality of wireless devices can now beneficially be charged simultaneously while being worn by a user seated in a vehicle.

While described in terms of a vehicular environment, the charging system formed in accordance with some embodiments, also applies to other portable embodiments, such as a portable radio environment where the battery of the portable radio is used as the a power source to charge body-worn accessories. This embodiment will be shown and described in conjunction with FIG. 6, but briefly the power source elements of electronics and transmit (TX) coil can be located in a portable electronic device, such as a portable battery powered radio, and used in conjunction with the charging interface to charge a battery of another body-worn device. A portable radio device having sufficient battery power to sustain the charging of other body-worn portable devices can provide for a complete charging system through the use of power transfer interface apparatus 120.

Figure 6:
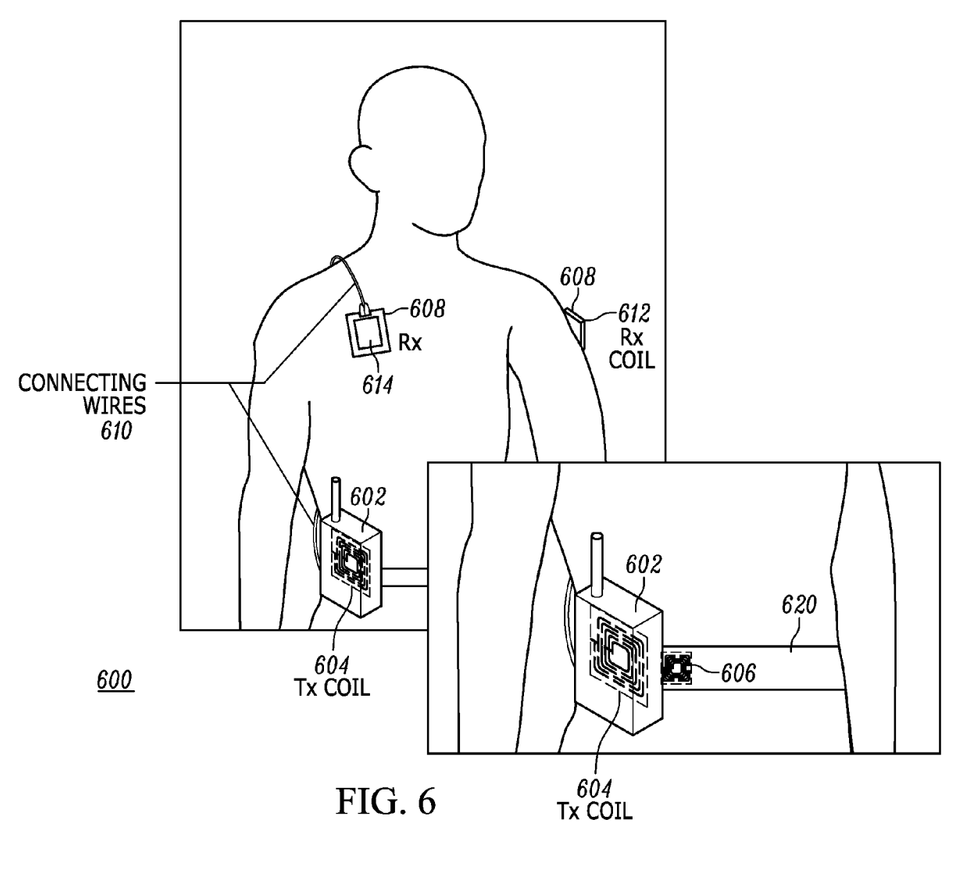
FIG. 6 is a diagram of the power transfer system being applied in multi-device charging sourced by a radio, in accordance with some embodiments.

FIG. 6 is a diagram of the power transfer system being applied in multi-device charging sourced by a radio, in accordance with some embodiments. One or more secondary repeater coils 608 can be used to charge one or more devices, however rather than using a vehicle, the power source is provided by a portable device, such as a body worn portable radio 602 having a source TX coil 604. In accordance with some embodiments, the charging interface, such as power transfer interface 120 of FIG. 1, comprises a primary repeater coil 606 and a plurality of secondary repeater coils 608. The primary repeater coil 606 and the plurality of secondary repeater coils 608 are integrated into one or more garments, such as a vest and/or a belt 620. The portable radio 602 comprises a transmit (TX) coil 604 internal charging electronics (such as electronics described in FIG. 4). The TX coil 604 is proximately located to one of the repeaters such as primary repeater coil 606 which can be located, for example, on a belt 620. Other secondary repeater coils 608 are wired to the primary repeater coil 606 and integrated within a garment, such as garment 112, previously described. The secondary repeater coils 608 can be used to charge the one or more body-worn devices. Controllers in the portable radio 602 and/or the portable accessory manage charging protocols as appropriate. Thus, one single portable device can be used to charge a plurality of other body-worn devices. This embodiment provides a complete-body-worn approach.

In operation, the charging TX coil 604 in the portable radio 602 worn on the waist transfers power wirelessly to the primary repeater coil 606 on the waist, for example the primary repeater being located in garments 112, such as belt 620 or vest. The power is then routed via wired interconnect 110 to other body worn secondary repeater coils 608, such as at the shoulder and/or arm of a vest or jacket. The secondary repeater coils 608 then transfer power wirelessly to portable battery powered devices, such as an RSM, camera, or the like, worn on the shoulder and/or arm having their own respective receive coils 612, 614. In still other embodiments, a portable device worn on the shoulder/arm having a TX coil can act as the source in conjunction with the power transfer interface 120 to charge the battery of sensors and other body-worn accessories.

Depending on power requirements, the embodiments of FIGS. 5 and 6 can use the power transfer interface 120 to power a plurality of portable electronic devices for applications in which the portable electronic devices do not have batteries. Additionally, the interface 120 can enable a mix of charging devices with batteries, while powering other electronic devices without batteries. For example, the power transfer interface 120 can be used to charge a camera in conjunction with powering an RSM device and sensor device.

Figure 7:
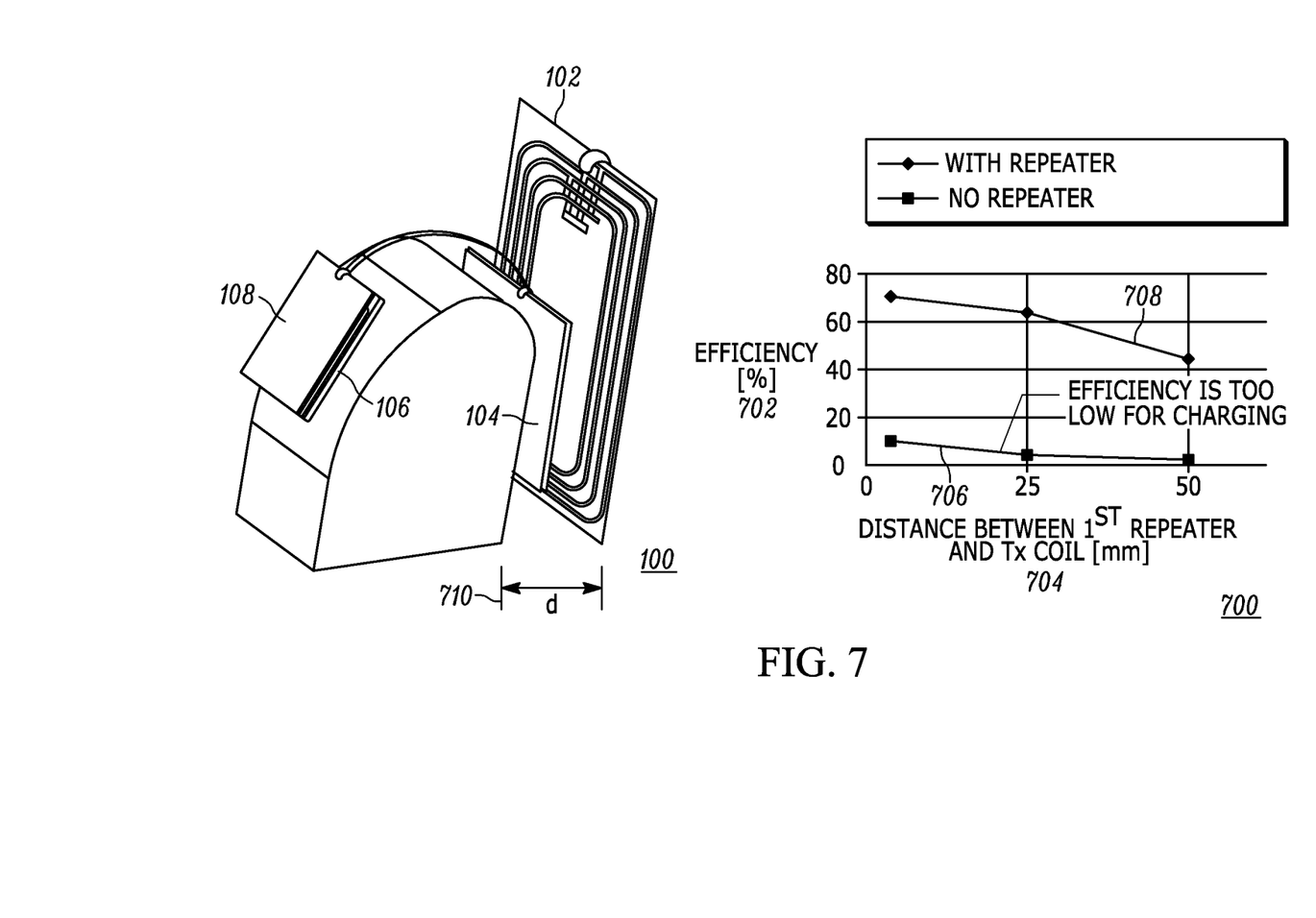
FIG. 7 is shows a graph of an example of efficiency versus distance with and without the power transfer interface in a charging system, in accordance with some embodiments.

FIG. 7 is a graph 700 showing an example of efficiency 702 versus distance 704 data with and without the repeater interface, for a charging system, such as charging system 400, formed in accordance with some embodiments. The lack of repeaters illustrated at 706 indicates that the efficiency is too low for charging. The use of interface repeater coils, such as repeater coils 104, 106, indicates at 708 that the efficiency was suitable for charging at distances (d) 710 of up to 50 mm between the primary repeater coil 104 and the transmit coil 102. This charging efficiency was achieved with a TX coil sized 160 mm×100 mm, a first repeater coil sized 100 mm×100 mm, a secondaryrepeater coil sized 60 mm×40 mm, and a RX coil sized 60 mm×40 mm.

While the garment can accommodate coils of various sizes, the portable electronic device having the RX coil 108 is typically limited in space. The use of the power transfer interface 120 advantageously provides the ability to use a small sized coil for the RX coil 108 while maintaining efficiency over longer distances. Thus, such coils are now able to be of a practical size for use in smaller portable accessories, such as a remote speaker microphone (RSM). The sizing of the repeater coils can be adjusted for different sized accessories, depending on the charging or power requirements.

Figure 8:
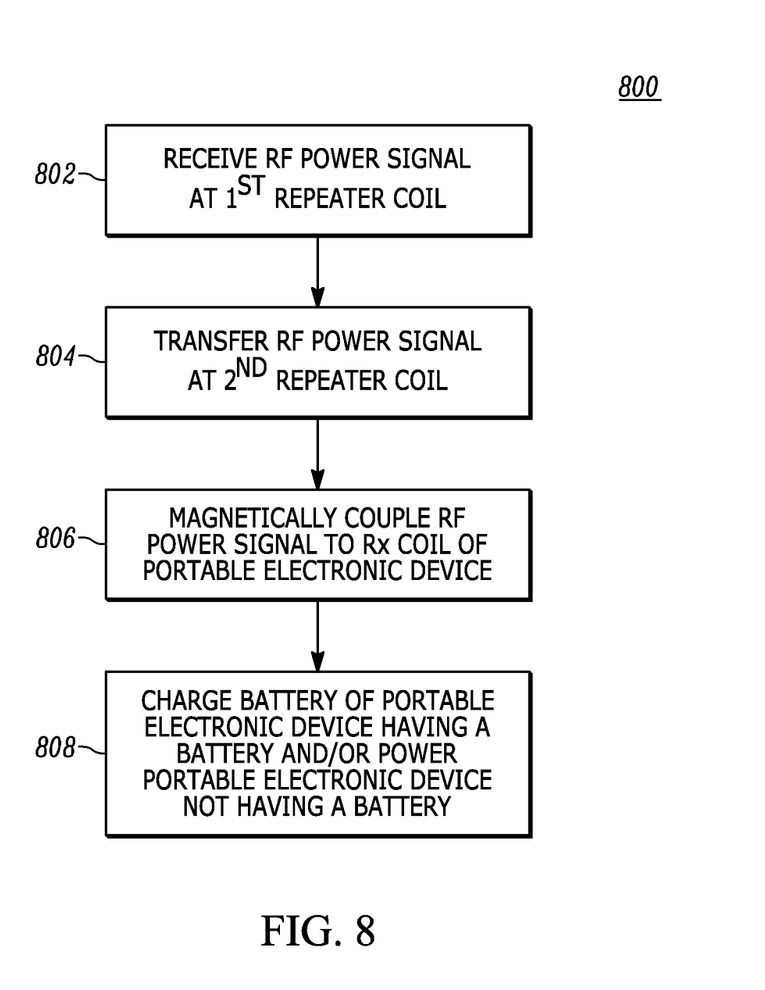
FIG. 8 is method for power transfer in a portable system, in accordance with some embodiments.

A technique for utilizing the power transfer for charging and/or powering a portable electronic device is described by method 800 of FIG. 8. Beginning at 802 the power transfer interface receives a radio frequency (RF) power signal at a primary repeater coil, and then transfers the RF power signal from the primary repeater coil to at least one secondary repeater coil at 804. The at least one secondary repeater coil then magnetically couples the transferred RF power signal to a receive coil of a portable electronic device at 806 which then charges a battery of the portable electronic device and/or powers a portable device not having a battery at 808.

From the overall system view, the technique's receiving step of the radio frequency (RF) power signal at the primary repeater coil at 802 can be further described by initially magnetically coupling (magnetic resonance coupling) the charging RF power signal from a transmit coil, located in a vehicle, to the primary repeater coil, located in a garment. This in-vehicle TX coil may be powered from an in-vehicle power source to generate the radio frequency (RF) power signal.

In accordance with some embodiments, the transmit coil can be an in-radio transmit coil which can be powered from a portable radio power source to generate the radio frequency (RF) power signal.

The power transfer method, apparatus and system beneficially allows one or more portable electronic devices to be automatically powered (for devices without batteries) and/or charged (for devices with batteries) while the one or more portable electronic devices are being worn.

Accordingly, an apparatus, system and method for over the air power transfer have been provided. Embodiments such as those disclosed herein provide a power transfer interface 120 formed of a primary repeater coil 104 and one or more secondary repeater coils 106 integrated within a garment 112 and coupled via a wired interconnect 110. The power transfer 120 can be applied to portable charging applications and/or portable powering applications of portable electronic devices. The power transfer apparatus, method and system can be operated by in both vehicular and portable radio environments. The integrated power transfer within a garment along with the automatic charging and/or powering of portable electronic devices while being worn is advantageous to users of such devices in terms of size, portability, ease of access and ability to wear and operate a plurality of devices without being encumbered by wires and contacts.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A power transfer system, comprising:
   a power source having a transmit coil integrated in a vehicle, the power source being driven to transmit a radio frequency (RF) power signal;
   a primary repeater coil for receiving the RF power signal via magnetic coupling, the primary repeater coil being attachable to and from a garment so as to align and proximately couple with the transmit coil integrated in the vehicle;
   one or more selectable secondary repeater coils for individually coupling to the primary repeater coil via a wired interconnect, the wired interconnect for routing RF power signal from the primary repeater coil to the selected secondary repeater coil, the selected secondary repeater coil being attachable to and detachable from the wired interconnect, each selected secondary repeater coil being alignable via markers on the garment, wherein different markers on the garment are associated with different sized secondary repeater coils of the one or more selectable secondary repeater coils; and
   at least one portable electronic device having a receive coil, the receive coil for wirelessly receiving the RF power signal from the selected secondary repeater coil coupled to the wired interconnect.

2. The power transfer system of claim 1, wherein the receive coil powers an element of the at least one portable electronic device.

3. The power transfer system of claim 1, wherein the RF power signal received by the receive coil charges a battery of the at least one portable electronic device.

4. The power transfer system of claim 1, wherein the power source comprises a portable radio having a transmit coil, the transmit coil magnetically coupling the RF power signal to the primary repeater coil.

5. The power transfer system of claim 1, wherein:
   the primary repeater coil aligns and proximately couples with the transmit coil; and
   the primary repeater coil is wired to a plurality of secondary repeater coils of the one or more selectable secondary repeater coils.

6. The power transfer system of claim 5, each of the plurality of plurality of secondary repeater coils for aligning and proximately coupling with a respective receive coil of each of the at least one portable electronic device.

7. The power transfer system of claim 1, wherein the at least one portable electronic device having the receive coil comprises a remote speaker microphone (RSM).

8. The power transfer system of claim 1, wherein the at least one portable electronic device having the receive coil comprises a sensor, a camera, a BLUETOOH accessory, or a WiFi accessory.

9. A method for power transfer in a portable system, comprising:
   aligning a primary repeater coil on a garment using markers on the garment;
   attaching the primary repeater coil to the garment;
   aligning at least one secondary receiver coil on a garment using indicators on the garment, the indicators being aligned with the primary transmit coil of the garment;
   attaching the at least one secondary repeater coil to the garment using the indicators on the garment;
   receiving a radio frequency (RF) power signal at the primary repeater coil from an in-vehicle transmit coil aligned with the primary repeater coil located in the garment;
   transferring the RF power signal from the primary repeater coil to the at least one secondary repeater coil over a wired interconnect; and
   magnetically coupling the transferred RF power signal from the at least one secondary repeater coil to at least one portable electronic device having a receive coil.

10. The method of claim 9, wherein receiving the radio frequency (RF) power signal at the primary repeater coil further comprises:
   magnetically coupling the RF power signal from a transmit coil to the primary repeater coil.

11. The method of claim 9, wherein prior to receiving the method further comprises:
   powering the in-vehicle transmit coil from an in-vehicle power source to generate the RF power signal.

12. The method of claim 10, wherein:
   simultaneously charging a plurality of portable electronic devices using the magnetically coupled transferred power signal received by each respective receive coil.

* * * * *